United States Patent
Bordoni et al.

(10) Patent No.: US 10,773,813 B2
(45) Date of Patent: Sep. 15, 2020

(54) AIRCRAFT WITH A PROPULSION UNIT COMPRISING A FAN AT THE REAR OF THE FUSELAGE

(71) Applicant: SAFRAN AIRCRAFT ENGINES, Paris (FR)

(72) Inventors: Nils Edouard Romain Bordoni, Melun (FR); Antoine Jean-Philippe Beaujard, Melun (FR); Nicolas Jerome Jean Tantot, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 619 days.

(21) Appl. No.: 15/216,626

(22) Filed: Jul. 21, 2016

(65) Prior Publication Data
US 2017/0137137 A1    May 18, 2017

(30) Foreign Application Priority Data

Jul. 22, 2015  (FR) ..................................... 15 56949

(51) Int. Cl.
*B64D 27/20*    (2006.01)
*B64D 27/14*    (2006.01)
(Continued)

(52) U.S. Cl.
CPC ............. *B64D 27/20* (2013.01); *B64D 27/14* (2013.01); *B64D 29/00* (2013.01); *B64D 29/04* (2013.01);
(Continued)

(58) Field of Classification Search
CPC ......... F02K 3/065; F02K 3/072; B64D 27/14; B64D 27/20; B64D 29/00; B64D 29/04; B64D 2027/005; F02C 7/14; F02C 7/20
See application file for complete search history.

(56) References Cited

U.S. PATENT DOCUMENTS 2,918,229 A  *  12/1959  Lippisch ............... B64C 39/062
                                                        244/15
4,608,819 A  *  9/1986  Colman .................. F01D 17/02
                                                        361/690
(Continued)

FOREIGN PATENT DOCUMENTS

FR          2951701        4/2011
FR          2989108        10/2013
(Continued)

OTHER PUBLICATIONS

French Search Report with English Translation Cover Sheet, dated May 16, 2016, French Application No. 1556949.

*Primary Examiner* — Todd E Manahan
*Assistant Examiner* — Thuyhang N Nguyen
(74) *Attorney, Agent, or Firm* — Womble Bond Dickinson (US) LLP

(57) ABSTRACT

The present invention relates to an aircraft comprising a fuselage (1) and a propulsion unit at the rear of the fuselage, the propulsion unit comprising at least one fan rotor (7, 8), a nacelle (14) fairing the fan and at least one connection means (15) connecting the nacelle to the fuselage, the fan being rotated by the energy supplied by at least one gas-turbine gas generator (2a, 2b) housed in the fuselage, said gas generator comprising auxiliary equipment cooled by a cooling circuit.
The aircraft is characterised in that said cooling circuit comprises at least one heat exchanger exchanging heat with the ambient air housed in one of said connection means (15) and/or in said nacelle (14). The cooling circuit optionally comprises also a heat exchanger exchanging heat with the ambient air, housed in the tail unit.

27 Claims, 2 Drawing Sheets

(51) Int. Cl.
    *B64D 33/10*     (2006.01)
    *B64D 29/00*     (2006.01)
    *F01D 13/00*     (2006.01)
    *F02K 3/062*     (2006.01)
    *B64D 29/04*     (2006.01)
    *B64D 33/02*     (2006.01)
    *B64D 33/08*     (2006.01)
    *F02C 7/12*     (2006.01)
    *F02K 3/072*     (2006.01)

(52) U.S. Cl.
    CPC ............ *B64D 33/02* (2013.01); *B64D 33/08* (2013.01); *B64D 33/10* (2013.01); *F01D 13/003* (2013.01); *F02C 7/12* (2013.01); *F02K 3/062* (2013.01); *F02K 3/072* (2013.01); *B64D 2033/0273* (2013.01); *F05D 2220/323* (2013.01); *F05D 2220/76* (2013.01); *F05D 2260/20* (2013.01); *Y02T 50/671* (2013.01)

(56) References Cited

U.S. PATENT DOCUMENTS

| | | | | |
|---|---|---|---|---|
| 5,123,242 | A * | 6/1992 | Miller | F02C 7/14 165/300 |
| 7,819,358 | B2 * | 10/2010 | Belleville | B64C 11/001 244/52 |
| 7,856,824 | B2 * | 12/2010 | Anderson | B64D 13/08 60/226.1 |
| 2003/0074884 | A1 * | 4/2003 | Snow | F02C 7/236 60/204 |
| 2007/0022731 | A1 * | 2/2007 | Sheoran | B64D 41/00 60/39.5 |
| 2015/0291285 | A1 * | 10/2015 | Gallet | F01D 13/02 415/60 |
| 2015/0315923 | A1 | 11/2015 | Bordoni | |

FOREIGN PATENT DOCUMENTS

FR             2997681          5/2014
WO    WO 2014072615 A1 *   5/2014  ............ F01D 13/02

* cited by examiner

AIRCRAFT WITH A PROPULSION UNIT COMPRISING A FAN AT THE REAR OF THE FUSELAGE

FIELD OF THE INVENTION

The present invention relates to the aeronautical field in which aircraft are propelled by a set of fan rotors disposed at the rear in line with the fuselage. The fan rotors are driven by contra-rotating free turbines, supplied by gas generators formed by turbojet engines.

PRIOR ART

In the patent application FR-A1-2 997 681, a novel aircraft architecture is proposed for reducing noise nuisance and fuel consumption of the aircraft while limiting aerodynamic drag.

In such an architecture, an aircraft is propelled by a propulsion system with contra-rotating fans, integrated at the rear of the aircraft fuselage, in line therewith. The propulsion system comprises two gas generators that supply a power turbine having two contra-rotating rotors for driving two fan rotors, the fans being disposed downstream the gas generators. The gas generators are gas-turbine engines incorporated in the fuselage with separate air intakes that each supply one gas generator. The diameter of the nacelle enclosing the fan rotors is, according to this embodiment, substantially equal to that of the largest cross section of the aircraft fuselage. The power turbine is also housed in this nacelle.

The object of the present invention is to provide a solution suited to the type of aircraft architecture and propulsion unit that has just been described so that the assembly functions in an optimum manner independently of the various flight conditions.

The gas-generator assembly, whether it be formed by a single gas-turbine engine or two or even more than two gas-turbine engines, presents a problem of cooling of the items of auxiliary equipment associated with its functioning. These are generally disposed in the vicinity of the engine and are themselves sources of heat that it is necessary to discharge. Since, while being inside the fuselage, they are situated relatively distant from the wall of the latter, they need a suitable cooling circuit, unlike a multiflow turbojet engine mounted conventionally on the fuselage or under the wings, the heat exchange surfaces of which, intended for cooling, are close to the external walls and easily accessible.

Moreover, modern auxiliary equipment is preferably electrical because of an increased electrical energy demand on aircraft. For example, starters, which until the present time were generally pneumatic, have become electrical with the use of electrical machines able to function both as motors or generators according to requirements. The use of electrical machines gives rise to an increased cooling requirement.

The problem is thus posed of an adaptation of the cooling circuit of the auxiliary equipment of a generator in an architecture with a rear propulsion unit.

The objective of the invention is to overcome this problem.

DISCLOSURE OF THE INVENTION

The invention relates to an aircraft comprising a fuselage and a propulsion unit downstream with respect to the fuselage, the propulsion unit comprising at least one fan rotor, a nacelle providing a fairing for the fan, and at least one connection means connecting the nacelle to the fuselage, the fan being rotated by the energy supplied by at least one gas-turbine gas generator housed in the fuselage, said gas generator comprising auxiliary equipment cooled by a cooling circuit.

In accordance with the invention, the aircraft is characterised in that said cooling circuit comprises at least one heat exchanger exchanging heat with the ambient air, housed in said connection means and/or in said nacelle.

Thus, by virtue of the invention, it is possible to cool effectively and to respond to a high demand for discharge of thermal energy by profiting from the exchange surfaces provided in zones which, through their location on the aircraft, are subjected to icing conditions during flight operations.

In accordance with another feature, the cooling circuit comprises a heat exchanger exchanging heat with the ambient air housed in the tail unit of the aircraft. The proximity of the tail unit because of the rear placement of the gas generator or generators allows this advantageous arrangement.

In accordance with another feature, the nacelle comprises a leading edge radially distant from the fuselage, said connection means comprise,g a radial arm with at least one surface portion disposed upstream of the leading edge of the nacelle with respect to the direction of airflow.

More particularly, with the fuselage comprising an upstream part of the nacelle, the diameter of which decreases to a point in line with the leading edge of the nacelle, said connection means being attached to the fuselage at least partly in this part of the fuselage of decreasing diameter.

Preferably, the cooling circuit comprises a heat exchanger exchanging heat with the ambient air.

The heat exchanger is arranged at least partly in said surface portion of the arm upstream of the leading edge of the nacelle.

In accordance with an advantageous embodiment, the heat exchanger comprises a set of blades each extending in the ambient air.

More precisely, the aircraft comprises an aerodynamic profile distant from said connection means, from the nacelle or from the tail unit and thermally connected to the set of blades.

The gas-turbine gas generator comprises at least one of the following items of auxiliary equipment: electricity generator driven by the gas generator, fuel pump, lubrication pump or electronic regulation computer.

In accordance with one embodiment, the aircraft comprises a power turbine inside a primary-flow duct, said fan is inside a secondary-flow duct and driven mechanically by the power turbine, the primary-flow duct of the power turbine and the secondary-flow duct of the fan are concentric, and the power turbine is supplied with gas issuing from said gas-turbine gas generator.

According to the preferred embodiment, the aircraft has in addition at least one of the following features:

It comprises two gas-turbine gas generators supplying the power turbine via a mixture of their output flows. In particular each of the generator or generators is a single-flow turbojet engine.

The propulsion unit of the aircraft comprises a power turbine formed by two contra-rotating rotors, each driving a fan rotor.

PRESENTATION OF THE FIGURES

The invention will be better understood and other aims, details, features and advantages thereof will emerge more clearly from a reading of the following detailed explanatory description of two embodiments of the invention given by way of purely illustrative and non-limitative examples with reference to the accompanying schematic drawings. In these drawings FIG. 1 is a schematic view in longitudinal section of the rear part of an aircraft according to the invention with its propulsion unit;

DETAILED DESCRIPTION OF EMBODIMENTS OF THE INVENTION

Figure 1:
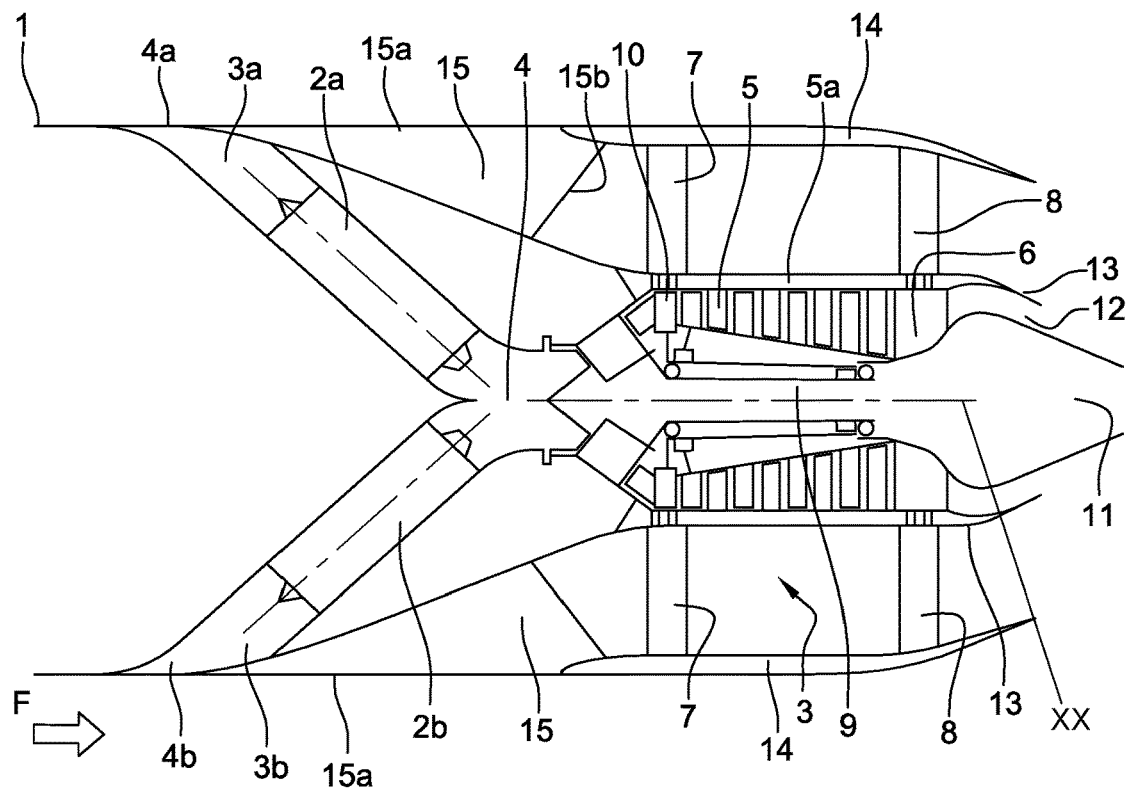
Figure 2:
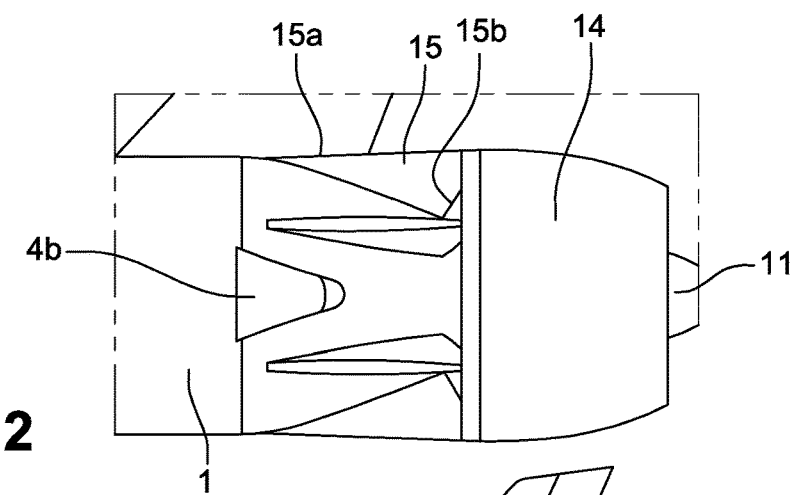
FIG. 2 is a schematic side view of the rear part of an aircraft according to the invention with its propulsion unit.

The invention applies in particular to an aircraft such as an aeroplane comprising a propulsion unit of the type depicted in FIG. 1 or FIG. 2.

As shown in FIG. 1, the propulsion unit is centred on the longitudinal axis XX of the fuselage 1 of the aircraft. It comprises, from upstream to downstream, in the direction of flow of the gases, two separate gas generators 2a, 2b simultaneously supplying a single power turbine 3.

Each gas generator 2a, 2b is a gas-turbine engine and comprises at least one compressor, a combustion chamber and at least one turbine (not shown in the figures).

Each gas generator 2a, 2b is housed inside a primary-flow duct 3a, 3b provided inside the fuselage. Separate air inlets 4a, 4b are provided for these ducts 3a, 3b in order to supply each gas generator 2a, 2b.

In the configuration shown in FIG. 1, these air inlets 4a, 4b are connected to the fuselage 1 of the aircraft, upstream of the gas generators 2a, 2b. More precisely, their internal wall is directly integrated in the fuselage 1 of the aircraft.

In other configurations, not shown here, the air inlets 4a, 4b may be separated from the fuselage in order to supply the compressors of the gas generators 2a, 2b with a flow less disturbed by the boundary layer on the fuselage 1.

In any event, the air inlets 4a, 4b are designed so as to limit any disturbances that they may create downstream on the flow air F running along the fuselage 1 and entering a propulsion unit that is described hereinafter. In addition, the inlets are situated here at the start of the part of the fuselage 1 that narrows as it goes towards said propulsion unit, so as to situate them away from the latter.

Preferably, the two primary-flow ducts 3a, 3b of the gas generators 2a, 2b converge on the longitudinal axis XX and form between them a V open towards the upstream end, the angle of opening of which is preferably between 80° and 120°.

The two primary-flow ducts 3a, 3b of the gas generators 2a, 2b converge in a central primary duct 4 that supplies the power turbine 3. A mixer (not shown in the figures) is preferably positioned at the region of convergence of the two ducts 3a, 3b, housing the gas generators 2a, 2b. The function of this mixer is to mix the gas flows issuing from the two gas generators 2a, 2b in order to create a homogeneous single gas flow at the outlet of the primary central duct 4.

The power turbine 3, which is supplied by this primary flow at the outlet of the central duct 4, is placed in line with the fuselage 1. It is provided with two contra-rotating turbine rotors 5, 6 in order to drive two fan motors 7, 8 in a contra-rotating fashion. These turbine rotors 5, 6 are coaxial and centred on the longitudinal axis XX. They turn about an interior casing 9 fixed to the structure of the aircraft.

Here a first turbine rotor 5 has blades secured to a tubular body 5a separating the primary-flow duct, in the power turbine 3, from the secondary-flow duct, in which the fan rotors 7, 8 are situated. The blades and the tubular body 5a of the first rotor 5 are connected to the bearings supporting the rotor 5 on the interior casing 9 by support arms 10 that pass through the primary duct upstream of the power turbine 3.

In the same example, the second rotor 6 has blades connected to a radially inner wall of the primary duct in the turbine 3 and interposed longitudinally between the blades of the first rotor 5.

Downstream of the power turbine 3, the radially inner part of the second rotor 6 is extended by a central body 11. Moreover, it is connected, by support arms 12, to a ring 13 supporting the blades of the downstream fan rotor 8. The ring 13 extends the tubular body 5a of the first rotor 5 and comprises a rearward extension so as to form, with the central body 11, a primary ejection nozzle at the discharge from the power turbine 3.

In the example presented, the propulsion unit is formed by two fan rotors 7, 8 ducted by a nacelle 14 fixed in the structure of the aircraft. The fan rotors have an outside diameter D that is close to the longest outside diameter of the fuselage 1 of the aircraft.

Here a first, upstream fan rotor 7 is positioned at the entrance to the power turbine 3. It is connected to the first turbine rotor 5 at the arms 10 that support upstream the cylindrical external body 5a. This upstream fan rotor 7 therefore turns at the same speed as the first rotor 5 of the power turbine 3.

In this same example, the second fan rotor 8, which is downstream, is positioned at the discharge from the power turbine 3. It is connected to the second turbine rotor 6 at the support ring 13 and the arms 12 that support it. This downstream fan rotor 8 therefore turns at the same speed as the second rotor 6 of the power turbine 3.

The rear position of the fan rotors 7, 8 and their large outside diameter D enables them to be supplied with air through the part of the boundary layer that has not been absorbed by the gas generators 2a, 2b. Thus, since the velocity of the boundary layer is relatively low, the speed of rotation of the fan rotors 7, 8 and of the rotors 5, 6 of the power turbine 3 will also remain fairly low. It is advantageously possible to reduce the rotation speed of the fan rotors 7, 8 to speeds below 340 m/s, for example around 250 m/s to 300 m/s.

Moreover, in a variant embodiment that is not described, the power turbine 3 may have only one rotor and the propulsion unit only one fan rotor associated with this rotor.

With reference to FIG. 2, the nacelle 14 of the fans 7, 8 is connected to the fuselage by connection means 15. They are in this example formed by circumferentially distributed holding arms, typically between three and six arms. These means connect, upstream of the first fan rotor 7, the nacelle 14 to a fixed structure of the aircraft, not shown. Increasing the number of arms 15 increases the homogeneity and symmetry of the absorption of the forces withstood by the nacelle 14. The rigidity of the latter can then be reduced, which helps to reduce the mass of the whole.

It is sought to reduce the disturbances of the holding arms 15 on the flow F entering the nacelle 14, as well as their drag. These holding arms 15 comprise a radial profiled cowling that extends from the fuselage 1 of the aircraft to the nacelle 14. In the example presented in FIG. 2, the cowling has a substantially trapezoidal shape between an elongate bottom base at its intersection with the fuselage 1, and a short external base at its intersection with the nacelle 14. It has upstream, in the direction of the flow F entering the nacelle 14, a leading edge 15a that connects the fuselage and the nacelle 14 in a direction substantially parallel to the axis XX. Downstream, its trailing edge 15b, oriented radially with respect to the flow F entering the nacelle 14, follows a direction that forms an angle close to a right angle with the fuselage 1.

Figure 3:
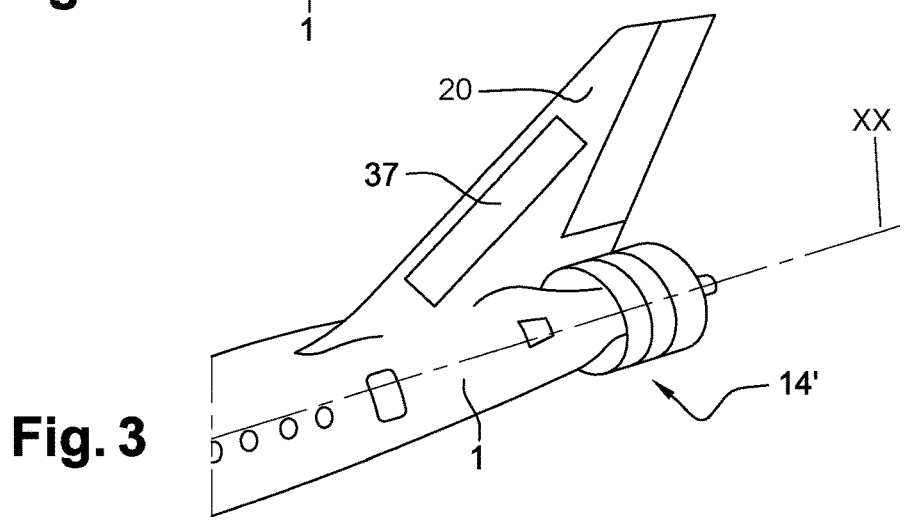
FIG. 3 shows a variant arrangement of the propulsion unit with respect to the tail unit.

FIG. 3 shows a variant arrangement of the rear propulsion unit in an aircraft. This comprises a tail unit 20 with a vertical fixed surface that provides the stability of the aircraft. It comprises where applicable other fixed and movable surfaces, the latter of the rudder unit, not shown. The fairing 14' of the propulsion unit can in this case be held by the tail unit directly without its being necessary to provide additional holding arms.

Figure 4:
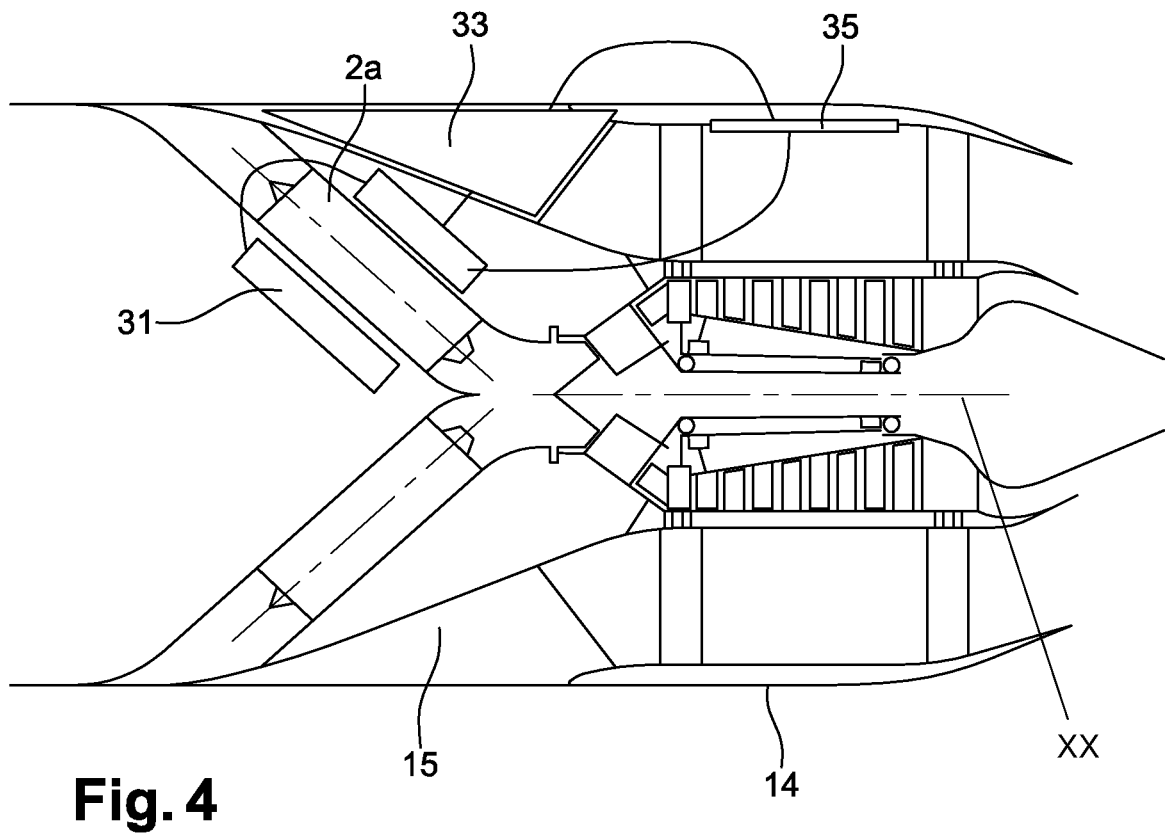
FIG. 4 shows the arrangement of the heat exchangers in the rear part of the fuselage.

The invention aims to profit from the surfaces thus available to discharge the heat produced by the gas generator. As can be seen in FIG. 4, the gas generators 2a and 2b are housed in the fuselage 1 and there exists a need to effectively cool their immediate environment. For this purpose a cooling circuit is provided in accordance with the invention. It comprises heat exchangers 31 disposed in heat exchange with the heat sources formed by the auxiliary machines, but also the casings of the combustion chambers and of the turbines. In these exchanges, a cooling fluid circulates by means of which the heat is discharged. The cooling fluid is able to be in particular air or oil or other heat-transfer fluid. The cooling circuit comprises heat exchangers 33 that are housed in at least one of the connection means formed by the radial arms 15. The circuit also optionally comprises at least one exchanger 35 in the nacelle 14 fairing the fan. The circuit also optionally comprises at least one exchanger 37 in the tail unit of the aircraft (cf. FIG. 3). The heat-transfer fluid is successively heated in the exchangers 31 and then cooled mainly by convection in the exchangers 33, 35 and 37 depending on the arrangement provided.

This solution makes it possible to discharge a large quantity of heat through the extent of the surfaces available, which furthermore are assured of being de-iced. It will be noted that the heat exchangers are preferentially provided so as to be in heat exchange with the ambient air not compressed mechanically.

Figure 5:
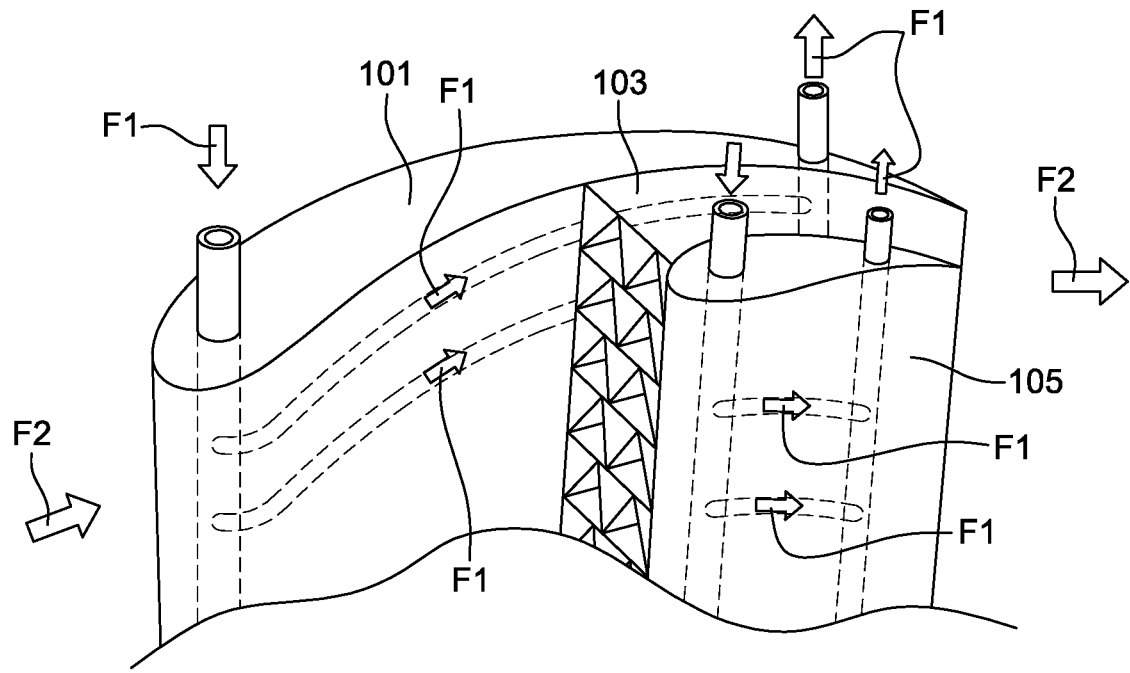
FIG. 5 shows a variant embodiment of the heat exchangers.

FIG. 5 relates to a variant embodiment improving the heat exchanges in accordance with the solution presented in the patent FR 2 989 108 in the name of the applicant.

The element 101 of the structure of the aircraft comprises a heat exchanger exchanging heat with the ambient air in which the heat-transfer fluid F1 circulates. The exchanger is in thermal contact with the ambient air along the wall of the element 101. The external wall of the element 101 is swept by a flow of air F2 when the aircraft is in flight. The element 101 here may be any one of the elements mentioned above, namely a means for connecting the nacelle to the fuselage, the fairing nacelle of the fan itself or the tail unit where applicable. In order to improve the heat exchanges with the air flow F2 flowing along the wall 101 of the element, a heat-conduction assembly 103 extends transversely in the air flow from this wall 101. This heat-conduction assemble 103 comprises a plurality of heat-conducting metal blades forming between them channels through which the air flow F2 travels. These blades are fixed to the wall 101 so as to be in thermal contact therewith. Advantageously, an aerodynamic profile 105 is placed in the flow parallel to the element 101. This profile also comprises, inside, a heat exchanger through which the heat-transfer fluid F1 travels. The metal blades of the heat-conduction assembly are also in thermal contact with the heat-transfer fluid flowing in the exchanger of the aerodynamic profile 105. The arrangement that has just been described substantially improves the heat exchanges between the heat-transfer fluid F1 that circulates inside the heat exchangers and the flow F2 of ambient air, without affecting the aerodynamic performances of the element 101.

The aerodynamic profile 105 with its heat-conduction assembly 103 may be added to at least one of the arms forming a connection means between the fuselage and the nacelle of the fan. It extends axially parallel to the arm, preferably over only part of the chord thereof.

It may be added close to the leading edge of the nacelle of the fan, radially inside or outside it. Where applicable it may be added to the tail unit.

The invention claimed is:

1. An aircraft comprising a fuselage having a longitudinal axis and a propulsion unit at a rear of the fuselage, the propulsion unit comprising at least one fan rotor, a nacelle fairing at the at least one fan rotor and a plurality of arms connecting the nacelle to the fuselage, the at least one fan rotor being rotated by energy supplied by at least one gas-turbine gas generator housed in the fuselage, said at least one gas-turbine gas generator comprising auxiliary equipment cooled by a cooling circuit, wherein said cooling circuit comprises at least one heat exchanger exchanging heat with ambient air, housed in one of said plurality of arms, said air ambient is not compressed mechanically,
wherein each of the plurality of aims has a leading edge and a trailing edge, the leading edge extending from the fuselage to the nacelle, said leading edge having a direction substantially parallel to the longitudinal axis.

2. The aircraft according to claim 1, wherein said aircraft comprises a tail unit, the cooling circuit comprising a second heat exchanger exchanging heat with the ambient air housed in the tail unit of the aircraft.

3. The aircraft according to claim 2, wherein the cooling circuit comprises a second heat exchanger housed in said nacelle.

4. The aircraft according to claim 3, wherein the second heat exchanger is arranged adjacent to a leading edge of the nacelle.

5. The aircraft according to claim 3, wherein the second heat exchanger is arranged between a first fan and a second fan of the propulsion unit.

6. The aircraft according to claim 1, wherein the nacelle comprises a leading edge distant radially from the fuselage, said plurality of arms comprising a radial arm having at least a surface portion situated upstream of the leading edge of the nacelle, said cooling circuit comprising a second heat exchanger exchanging heat with the ambient air.

7. The aircraft according to claim 6, wherein the fuselage comprises a part upstream of the nacelle, a diameter of which decreases to a point in line with the leading edge of the nacelle, said plurality of arms being attached to the fuselage at least partly in this part of the fuselage of decreasing diameter.

8. The aircraft according to claim 6, wherein the cooling circuit comprises a second heat exchanger housed in said nacelle.

9. The aircraft according to claim 8, wherein the second heat exchanger is arranged adjacent to a leading edge of the nacelle.

10. The aircraft according to claim 8, wherein the second heat exchanger is arranged between a first fan and a second fan of the propulsion unit.

11. The aircraft according to claim 6, wherein said cooling circuit comprises said second heat exchanger exchanging heat with the ambient air arranged at least partly in said surface portion of the radial arm upstream of the leading edge of the nacelle.

12. The aircraft according to claim 1, wherein the cooling circuit comprises a heat exchanger communicating thermally with a heat-conduction assembly formed by blades each extending in the ambient air.

13. The aircraft according to claim 12, wherein an aerodynamic profile is arranged distant from said plurality of arms and is thermally connected to the blades.

14. The aircraft according to claim 1, wherein said gas-turbine gas generator comprises at least one of the following items of auxiliary equipment: electricity generator driven by the gas-turbine gas generator, fuel pump, lubrication pump, electronic regulation computer.

15. The aircraft according to claim 1, wherein said aiFrraft comprises a power turbine inside a primary-flow duct, said at least one fan rotor being inside a secondary-flow duct and driven mechanically by the power turbine, the primary-flow duct of the power turbine and the secondary-flow duct of the fan being concentric, the power turbine being supplied with gases issuing from said gas-turbine gas generator.

16. The aircraft according to claim 15, wherein said aircraft comprises two gas-turbine gas generators supplying the power turbine via a mixture of discharge flows of said two gas-turbine gas generators.

17. The aircraft according to claim 1, wherein each of the at least one gas-turbine gas generator or generators is a single-flow turbojet engine.

18. The aircraft according to claim 1, wherein the cooling circuit comprises a second heat exchanger housed in said nacelle.

19. The aircraft according to claim 18, wherein the second heat exchanger is arranged adjacent to a leading edge of the nacelle.

20. The aircraft according to claim 18, wherein the second heat exchanger is arranged between a first fan and a second fan of the propulsion unit.

21. The aircraft according to claim 1, wherein the heat exchanger is arranged in an elongate bottom base of the plurality of arms, said elongated bottom base being substantially parallel to an axis of the fuselage.

22. The aircraft according to claim 1, wherein each of said plurality of arm has the leading edge connecting the fuselage and the nacelle, said leading edge having a direction substantially parallel to the longitudinal axis, the first heat exchanger being installed in a zone radially inferior to the leading edge of each of the plurality of arms.

23. An aircraft comprising a fuselage having a longitudinal axis and a propulsion unit at a rear of the fuselage, the propulsion unit comprising at least one first and second fan rotors, a nacelle fairing the at least one first and second fan rotors and at least one arm connecting the nacelle to the fuselage, the at least one first and second fan rotors being rotated by energy supplied by at least one gas-turbine gas generator housed in the fuselage, said at least one gas-turbine gas generator comprising auxiliary equipment cooled by a cooling circuit, wherein said cooling circuit comprises at least one first heat exchanger and second heat exchanger exchanging heat with ambient air circulating in a secondary-flow duct, the first heat exchanger is the at least one arm and the second heat exchanger is housed in said nacelle, wherein the second heat exchanger is arranged axially between the at least one first and second fan rotors and communicating thermally with a heat-conduction assembly formed by blades, each blade extending transversally in the ambient air and radially inside the secondary-flow duct, and wherein said at least one arm has a leading edge and a trailing edge, the leading edge extending from the fuselage to the nacelle, said leading edge having a direction substantially parallel to the longitudinal axis.

24. The aircraft according to claim 23, wherein an aerodynamic profile is arranged distant from said nacelle and is thermally connected to the blades.

25. An aircraft comprising a fuselage having a longitudinal axis and a propulsion unit at a rear of the fuselage, the propulsion unit comprising at least one fan rotor, a nacelle fairing the at least one fan rotor and a plurality of connecting arms connecting the nacelle to the fuselage, the at least one fan rotor being rotated by energy supplied by at least one gas-turbine gas generator housed in the fuselage, said at least one gas-turbine gas generator comprising auxiliary equipment cooled by a cooling circuit, wherein said cooling circuit comprises at least one first and second heat exchangers exchanging heat with ambient air, the first heat exchanger being housed in one of said plurality of connecting arms and the second heat exchanger being housed in said nacelle, each of the plurality of connecting arm has a leading edge and a trailing edge, the leading edge extending from the fuselage to the nacelle, said leading edge having a direction substantially parallel to the longitudinal axis, the first heat exchanger being installed in a zone radially inferior to the leading edge of the connecting arm.

26. The aircraft according to claim 25, wherein the second heat exchanger communicates thermally with a heat-conduction assembly formed by blades each extending transversally in the ambient air and radially in secondary-flow duct in which the at least one fan rotor is enclosed, the second heat exchanger comprising an aerodynamic profile arranged distant from said nacelle and being connected to the blades.

27. The aircraft according to claim 25, wherein the second heat exchanger communicates thermally with a heat-conduction assembly formed by blades each extending transversally in the ambient air and radially in secondary-flow duct in which the at least one fan rotor is enclosed, the exchanger heat comprising an aerodynamic profile arranged distant from said plurality of connecting arms and being connected to the blades.

* * * * *